United States Patent [19]

Niessner

[11] Patent Number: 5,639,826

[45] Date of Patent: Jun. 17, 1997

[54] THERMOPLASTIC MOLDING MATERIALS BASED ON POLYCARBONATES THERMOPLASTIC POLYURETHANES AND STYRENE COPOLYMERS

[75] Inventor: Norbert Niessner, Friedelsheim, Germany

[73] Assignee: BASF Aktiengesellschaft, Ludwigshafen, Germany

[21] Appl. No.: 668,715

[22] Filed: Jun. 24, 1996

Related U.S. Application Data

[63] Continuation of Ser. No. 409,970, Mar. 24, 1995, abandoned, which is a continuation of Ser. No. 199,023, Feb. 18, 1994, abandoned.

[30] Foreign Application Priority Data

Feb. 24, 1993 [DE] Germany ............... 43 05 637.7

[51] Int. Cl.⁶ .................. C08L 69/00; C08L 75/04; C08L 25/12
[52] U.S. Cl. .................. 525/127; 525/130
[58] Field of Search .................. 525/127, 130

[56] References Cited

U.S. PATENT DOCUMENTS

| | | | |
|---|---|---|---|
| 4,179,479 | 12/1979 | Carter, Jr. .................. | 525/66 |
| 4,912,177 | 3/1990 | Skochdopole et al. .................. | 525/66 |
| 4,929,674 | 5/1990 | Nouvertne et al. .................. | 525/67 |

FOREIGN PATENT DOCUMENTS

| | | |
|---|---|---|
| 104695 | 4/1984 | European Pat. Off. . |
| 265790 | 5/1988 | European Pat. Off. . |
| 337206 | 10/1989 | European Pat. Off. . |
| 440442 | 8/1991 | European Pat. Off. . |
| 3521408 | 12/1986 | Germany . |

OTHER PUBLICATIONS

Chen, "Rubber Toughened Polyblends of PC with SMA", Polym. Networks Blends 3(2), pp. 107–114 (1993).

*Primary Examiner*—David Buttner
*Attorney, Agent, or Firm*—Keil & Weinkauf

[57] ABSTRACT

Thermoplastic molding materials contain, as essential components,

A) from 10 to 90% by weight of an aromatic polycarbonate,
B) from 5 to 50% by weight of a thermoplastic polyurethane and
C) from 5 to 40% by weight of a copolymer of
   $c_1$) from 70 to 85% by weight of styrene or a substituted styrene of the general formula I

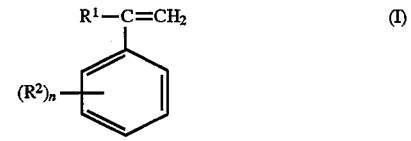

where $R^1$ is alkyl of 1 to 8 carbon atoms or hydrogen, $R^2$ is alkyl of 1 to 8 carbon atoms and n is 0, 1, 2 or 3, and
   $c_2$) from 15 to 30% by weight of (meth)acrylonitrile, (meth)acrylic acid, $C_1$–$C_8$-alkyl (meth)acrylate, maleic anhydride, acrylamide, vinyl esters of $C_1$–$C_6$-carboxylic acids, maleimides N-substituted by $C_1$–$C_8$-alkyl or by $C_6$–$C_{20}$-aryl, or mixtures thereof.

6 Claims, No Drawings

THERMOPLASTIC MOLDING MATERIALS BASED ON POLYCARBONATES THERMOPLASTIC POLYURETHANES AND STYRENE COPOLYMERS

This application is a continuation of application Ser. No. 08/409,970, filed on Mar. 24, 1995, now abandoned, which is a continuation of application Ser. No. 08/199,023, filed on Feb. 18, 1994, now abandoned.

The present invention relates to thermoplastic molding materials containing, as essential components A) from 10 to 90% by weight of an aromatic polycarbonate, B) from 5 to 50% by weight of a thermoplastic polyurethane and C) from 5 to 40% by weight of a copolymer of c$_1$) from 70 to 85% by weight of styrene or a substituted styrene of the formula I

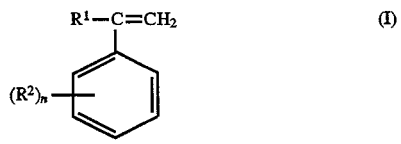

where $R^1$ is alkyl of 1 to 8 carbon atoms or hydrogen, $R^2$ is alkyl of 1 to 8 carbon atoms and n is 0, 1, 2 or 3, and c$_2$) from 15 to 30% by weight of (meth)acrylonitrile, (meth)acrylic acid, $C_1$–$C_8$-alkyl (meth)acrylate, maleic anhydride, acrylamide, vinyl esters of $C_1$–$C_6$-carboxylic acids, maleimides N-substituted by $C_1$–$C_8$-alkyl or by $C_6$–$C_{20}$-aryl, or mixtures thereof.

The present invention furthermore relates to the use of these thermoplastic molding materials for the production of fibers, films and moldings and to the moldings obtainable from the thermoplastic molding materials.

Owing to their property profile, thermoplastic molding materials based on polycarbonates, thermoplastic polyurethanes and styrene copolymers have a very wide range of uses, for example in automotive construction, in the building sector, in the leisure and sports sector, for office machines and in electrical equipment and household appliances.

EP-A 265 790 discloses blends of polycarbonates and thermoplastic polyurethanes, which may also contain styrene polymers. However, the flow and the transparency are unsatisfactory here.

EP-A 377 206 describes blends of thermoplastic poly (ester) carbonates, thermoplastic polyurethanes and diene-based graft polymers. However, these blends are not transparent, exhibit little flow and have poor thermal aging stability.

The blends of polycarbonates, thermoplastic polyurethanes and acrylate polymers are described in U.S. Pat. No. 4,179,479. Here, however, the stress cracking resistance under the action of solvents is unsatisfactory.

U.S. Pat. No. 4,912,177 discloses molding materials obtained from polycarbonates and thermoplastic polyurethanes. The poor flow is a disadvantage here.

It is an object of the present invention to provide molding materials which are based on polycarbonates and thermoplastic polyurethanes and do not have the stated disadvantages.

We have found that this object is achieved, according to the invention, by the thermoplastic molding materials defined at the outset. We have also found the use of these thermoplastic molding materials for the production of fibers, films and moldings, and the moldings obtainable from the thermoplastic molding materials.

The novel thermoplastic molding materials contain, as component A), from 10 to 90, preferably from 30 to 80, in particular from 40 to 75, % by weight of at least one polycarbonate.

Examples of suitable polycarbonates are those based on diphenols of the formula II

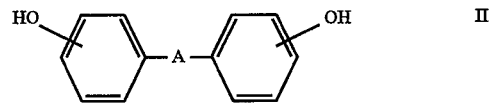

where A is a single bond, $C_1$–$C_3$-alkylene, $C_2$- or $C_3$-alkylidene, $C_3$–$C_6$-cycloalkylidene, —S— or —SO$_2$—.

Examples of preferred diphenols of the formula II are 4,4'-di-hydroxybiphenyl, 2,2-bis-(4-hydroxyphenyl)-propane, 2,4-bis-(4-hydroxyphenyl)-2-methylbutane, and 1,1-bis-(4-hydroxyphenyl)-cyclohexane. 2,2-bis-(4-Hydroxyphenyl)-propane and 1,1-bis-(4-hydroxyphenyl)-cyclohexane are particularly preferred.

Both homopolycarbonates and copolycarbonates are suitable as component A), the bisphenol A homopolymer as well as the copolycarbonates of bisphenol A being preferred.

The suitable polycarbonates may be branched in a known manner, preferably by the incorporation of from 0.05 to 2.0 mol %, based on the sum of the diphenols used, of at least trifunctional compounds, for example those having three or more phenolic OH groups.

The polycarbonates suitable as component A) may furthermore be monosubstituted to trisubstituted by halogen, preferably by chlorine and/or bromine, in the aromatic units. However, halogen-free compounds are particularly preferred.

Polycarbonates which have relative viscosities $\eta_{rel}$ of from 1.10 to 1.50, in particular from 1.25 to 1.40, have proven particularly suitable. This corresponds to weight average molecular weights $M_w$ of from 10,000 to 200,000, preferably from 20,000 to 80,000.

The diphenols of the general formula II are known per se or can be prepared by known processes.

The polycarbonates can be prepared, for example, by reacting the diphenols with phosgene by the phase boundary method, or with phosgene by the method in the homogeneous phase (ie. the pyridine method), the molecular weight to be established in each case being achieved in a known manner by means of a corresponding amount of known chain terminators. (With regard to polydiorganosiloxane-containing polycarbonates, see for example, German Laid-Open Application DOS 3,334,782.)

Examples of suitable chain terminators are phenol, p-tert-butyl-phenol and long-chain alkylphenols, such as 4-(1,3-tetramethyl-butyl)-phenol, according to German Laid-Open Application DOS 2,842,005, or monoalkylphenol or dialkylphenol having a total of 8 to 20 carbon atoms in the alkyl substituents, according to DE-A 35 06 472, for example p-nonylphenol, 3,5-di-tert-butylphenol, p-tert-octylphenol, p-dodecylphenol, 2-(3,5-dimethylheptyl)-phenol and 4-(3,5-dimethylheptyl)-phenol.

Further suitable polycarbonates are those based on hydroquinone or resorcinol.

Mixtures of different polycarbonates can also be used as component A).

The novel thermoplastic molding materials contain, as component B), from 5 to 50, preferably from 10 to 40, in particular from 15 to 30, % by weight of at least one thermoplastic polyurethane.

Thermoplastic polyurethanes and processes for their preparation are known per se and are described, for example, in DE-A 36 28 562.

Suitable thermoplastic polyurethane can be prepared by reacting organic, preferably aromatic, diisocyanates, polyhydroxyl compounds having weight average molecular weights of from 500 to 8000 and chain extenders having weight average molecular weights of from 60 to 400, in the presence or absence of catalysts.

Examples of suitable organic diisocyanates are aliphatic, cycloaliphatic and, preferably, aromatic diisocyanates. Specific examples are aliphatic diisocyanates, such as hexamethylene diisocyanate, cycloaliphatic diisocyanates, such as isophorone diisocyanate, cyclohexane 1,4-diisocyanate, 1-methylcyclohexane 2,4- and 2,6-diisocyanate and the corresponding isomer mixtures, dicyclohexylmethane 4,4'-, 2,4'- and 2,2'-diisocyanate and the corresponding isomer mixtures and preferably aromatic diisocyanates, such as toluylene 2,4-diisocyanate, mixtures of toluylene 2,4- and 2,6-diisocyanate, diphenylmethane 4,4'-, 2,4'- and 2,2'-diisocyanate, mixtures of diphenylmethane 2,4'- and 4,4'-diisocyanate, urethane-modified liquid diphenylmethane 4,4'- and/or 2,4'-diisocyanates, 4,4'-diisocyanato-1,2-diphenylethane and naphthylene 1,5-diisocyanate. Hexamethylene diisocyanate, isophorone diisocyanate, naphthylene 1,5-diisocyanate, diphenylmethane diisocyanate isomer mixtures having a diphenylmethane 4,4'-diisocyanate content of more than 96% by weight and in particular diphenylmethane 4,4'-diisocyanate are preferably used.

Preferred higher molecular weight polyhydroxy compounds with a molecular weight of from 500 to 8000 are polyetherols and polyesterols. However, hydroxyl-containing polymers, for example polyacetals, such as polyoxymethylenes, and especially water-insoluble formals, for example polybutanediol formal and polyhexanediol formal, and polycarbonates, in particular those obtained from diphenyl carbonate and 1,6-hexanediol, prepared by esterification and having the abovementioned molecular weights, are also suitable. The polyhydroxy compounds must be at least predominantly linear, ie. bifunctional for the purposes of the isocyanate reaction. The stated polyhydroxy compounds can be used as individual components or in the form of mixtures.

Suitable polyetherols can be prepared by reacting one or more alkylene oxides where the alkylene radical is of 2 to 4 carbon atoms with an initiator molecule which contains two bound active hydrogen atoms. Examples of alkylene oxides are ethylene oxide, 1,2-propylene oxide and 1,2- and 2,3-butylene oxide. Ethylene oxide and mixtures of 1,2-propylene oxide and ethylene oxide are preferably used. The alkylene oxides may be used individually, alternately in succession or as a mixture. Examples of suitable initiator molecules are water, amino alcohols, such as N-alkyldiethanolamines, for example N-methyldiethanolamine and diols, such as ethylene glycol, 1,3-propylene glycol, 1,4-butanediol and 1,6-hexanediol. Mixtures of initiators may also be used. Other suitable polyetherols are hydroxyl-containing polymers of tetrahydrofuran (polyoxytetramethylene glycols).

Polyetherols which comprise 1,2-propylene oxide and ethylene oxide and in which more than 50%, preferably from 60 to 80%, of the OH groups are primary hydroxyl groups and at least some of the ethylene oxide is arranged as a terminal block, in particular polyoxytetramethylene glycols, are preferably used.

Such polyetherols may be obtained by polymerizing first the 1,2-propylene oxide and then the ethylene oxide with the initiator or first copolymerizing the total amount of 1,2-propylene oxide as a mixture with some of the ethylene oxide and then polymerizing on the remaininder of the ethylene oxide or polymerizing first some of the ethylene oxide then the total amount of 1,2-propylene oxide and then the remainder of the ethylene oxide with the initiator in a gradual process.

The essentially linear polyetherols have weight average molecular weights of from 500 to 8000, preferably from 600 to 6000, in particular from 800 to 3500. They may be used both individually and in the form of mixtures with one another.

Suitable polyesterols can be prepared, for example, from dicarboxylic acids of 2 to 12, preferably 4 to 8, carbon atoms and polyhydric alcohols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures, for example in the form of a mixture of succinic, glutaric and adipic acid. Mixtures of aromatic and aliphatic dicarboxylic acids may also be used. For the preparation of the polyesterols, it may be advantageous to use, instead of the dicarboxylic acids, the corresponding dicarboxylic acid derivatives, such as dicarboxylates where the alcohol radical is of 1 to 4 carbon atoms, dicarboxylic anhydrides or dicarbonyl chlorides. Examples of polyhydric alcohols are glycols of 2 to 10, preferably 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols may be used alone or, if required, as mixtures with one another.

Esters of carbonic acid with the stated diols, in particular those of 4 to 6 carbon atoms, such as 1,4-butanediol and/or 1,6-hexanediol, condensates of ω-hydroxycarboxylic acids, for example ω-hydroxycaproic acid, and preferably polymers of lactones, for example unsubstituted or substituted ω-caprolactones, are also suitable.

Preferably used polyesterols are dialkylene glycol polyadipates where the alkylene radical is of 2 to 6 carbon atoms, eg. ethanediol polyadipates, 1,4-butanediol polyadipates, ethanediol butanediol 1,4-polyadipates, 1,6-hexanediol neopentylglycol polyadipates, polycaprolactones and in particular 1,6-hexanediol 1,4-butanediol polyadipates.

The polyesterols have weight average molecular weights of from 500 to 6000, preferably from 800 to 3500.

Preferred chain extenders having weight average molecular weights of from 60 to 400, preferably from 60 to 300, are aliphatic diols of 2 to 12, preferably 2, 4 or 6, carbon atoms, eg. ethanediol, 1,6-hexanediol, diethylene glycol, dipropylene glycol and in particular 1,4-butanediol. However, diesters of terephthalic acid with glycols of 2 to 4 carbon atoms, eg. bis-ethylene glycol terephthalate or bis-1,4-butanediol terephthalate, hydroxyalkylene ethers of hydroquinone, eg. 1,4-di-(β-hydroxyethyl)-hydroquinone, (cyclo)aliphatic diamines, eg. 4,4'-diaminodicyclohexylmethane, 3,3'-dimethyl-4,4'-diaminodicyclohexylmethane, isophoronediamine, ethylenediamine, 1,2- and 1,3-propylenediamine, N-methyl-1,3-propylenediamine and N,N'-dimethyethylenediamine, and aromatic diamines, eg. 2,4- and 2,6-toluylenediamine, 3,5-diethyl-2,4-toluylenediamine and 3,5-diethyl-2,6-toluylenediamine, and primary ortho-di-, tri- and/or tetraalkyl-substituted 4,4'-diaminodiphenylmethanes.

In order to establish the hardness and melting point of the thermoplastic polyurethanes, the amounts of the polyhydroxy compounds and chain extenders can be varied within relatively wide molar ratios. Molar ratios of polyhydroxy compounds to chain extenders of from 1:1 to 1:12, in particular from 1:1.8 to 1:6.4, have proven useful, the hardness and the melting point of the thermoplastic polyurethanes increasing with increasing content of diols.

For the preparation of the thermoplastic polyurethanes, the components are reacted in amounts such that the ratio of the number of equivalents of NCO groups of the diisocyanates to the total number of equivalents of the hydroxyl groups or hydroxyl and amino groups of the polyhydroxy compounds and chain extenders is from 1:0.85 to 1:1.20, preferably from 1:0.95 to 1:1.05, in particular from 1:0.98 to 1:1.02.

Suitable catalysts which accelerate in particular the reaction between the NCO groups of the diisocyanates and the hydroxyl groups of the polyhydroxy compounds and chain extenders are the conventional tertiary amines known from the prior art, for example triethylamine, dimethylcyclohexylamine, N-methylmorpholine, N,N'-dimethylpiperazine, 2-(dimethylaminoethoxy)-ethanol, diazabicyclo[2.2.2]octane and the like, and in particular organic metal compounds, such as titanic esters, iron compounds, eg. iron(III) acetylacetonate, tin compounds, eg. tin diacetate, tin dioctoate, tin dilaurate or the dialkyltin salts of aliphatic carboxylic acids such as dibutyltin diacetate, dibutyltin dilaurate or the like. The catalysts are usually used in amounts of from 0.001 to 0.1 parts per 100 parts of polyhydroxy compound.

The novel thermoplastic molding materials contain, as component C), from 5 to 40, preferably from 10 to 30, % by weight of a copolymer of $c_1$) from 70 to 85, preferably from 75 to 82, % by weight of styrene or substituted sytrenes of the general formula I and $c_2$) from 15 to 30, preferably from 18 to 25, % by weight of (meth)acrylonitrile, (meth)acrylic acid, $C_1$–$C_8$-alkyl (meth)acrylates, maleic anhydride, acrylamide, vinyl esters of $C_1$–$C_6$-carboxylic acids, maleimides N-substituted by $C_1$–$C_8$-alkyl or by $C_6$–$C_{20}$-aryl, or mixtures thereof.

Styrene and α-methylstyrene are preferably used as component $c_1$). Examples of preferred components $c_2$) are acrylonitrile, $C_1$–$C_4$-alkyl methacrylates, in particular methyl methacrylate and tert-butyl methacrylate, maleic anhydride and phenylmaleimide and mixtures thereof.

Particularly preferred components C) are styrene/acrylonitrile copolymers, α-methylstyrene/acrylonitrile copolymers, styrene/maleic anhydride copolymers, styrene/phenylmaleimide copolymers, styrene/methyl methacrylate copolymers, styrene/acrylonitrile/maleic anhydride copolymers, styrene/acrylonitrile/phenylmaleimide copolymers, α-methylstyrene/acrylonitrile/methyl methacrylate copolymers, α-methylstyrene/acrylonitrile/tert-butyl methacrylate copolymers, styrene/acrylonitrile/tert-butyl methacrylate copolymers, in particular styrene/acrylonitrile copolymers and α-methylstyrene/acrylonitrile copolymers.

The copolymers C) have weight average molecular weights $\bar{M}_w$ of from 10,000 to 1,000,000 and can be prepared by known processes, such as mass, suspension, solution or emulsion polymerization.

Furthermore, the novel thermoplastic molding materials may contain up to 60, in particular up to 20, % by weight of fibrous or particulate fillers or mixtures thereof. These are preferably commercially available products. Processing assistants and stabilizers, such as UV stabilizers, lubricants and antistatic agents, are usually used in amounts of from 0.01 to 5% by weight, whereas reinforcing agents, such as carbon fibers and glass fibers, are used in amounts of from 5 to 40% by weight.

The glass fibers used may consist of E, A or C glass and are preferably treated with a size and an adhesion promoter. The diameter is in general from 6 to 20 μm. Both rovings and cut glass fibers having a length of from 1 to 10, preferably from 3 to 6, mm may be used.

Fillers or reinforcing agents, such as glass spheres, mineral fibers, whiskers, alumina fibers, mica, quartz powder and wollastonite, may also be added.

Metal flakes (for example aluminum flakes from Transmet Corp.), metal powders, metal fibers, metal-coated fillers (for example nickel-coated glass fibers) and other additives which provide shielding against electromagnetic waves may also be mentioned.

Aluminum flakes (K 102 from Transmet) are particularly suitable for EMI purposes (electro-magnetic interference), as well as mixtures of this material with additional carbon fibers, conductivity carbon black or nickel-coated carbon fibers.

The novel molding materials may also contain further additives, such as dyes, pigments and antioxidants.

Components A) to C) and, if required, the additives may be mixed by any known method. However, the components are preferably mixed together by extrusion, kneading or roll milling. The molding materials are preferably prepared by mixing in an extruder at from 200° to 320° C.

The novel thermoplastic molding materials can be processed by the known methods for processing thermoplastics, for example by extrusion, injection molding, calendering, blow molding, pressing or sintering, and are suitable for the production of fibers, films and moldings.

The novel thermoplastic molding materials have great toughness in conjunction with good flow and high thermal aging stability.

EXAMPLES

The following components were used.

Component A)

A commercial polycarbonate based on 2,2-bis-(4-hydroxyphenyl)-propane (bisphenol A) and having a viscosity number of 61.6 ml/g, measured in a 0.5% strength by weight solution in $CH_2Cl_2$ at 23° C. (Makrolon® 2800 from Bayer AG).

Component B)

A thermoplastic polyurethane prepared by reacting a 1000 g of butanediol adipate having an OH number of 46, 360 g of diphenylmethane 4,4'-diisocyanate and 90.89 g of butanediol.

Component C)

A styrene/acrylonitrile copolymer containing 19% by weight of acrylonitrile and having a viscosity number of 70 ml/g (measured in a 0.5% strength by weight solution in dimethylformamide at 23° C.).

Component CV)

A styrene/acrylonitrile copolymer containing 35% by weight of acrylonitrile and having a viscosity number of 80 ml/g (measured in a 0.5% strength by weight solution in dimethylformamide at 23° C.).

Additive

60% by weight of $TiO_2$ mixed with 40% by weight of CV

EXAMPLE 1

The components were mixed in a twin-screw extruder (ZSK 30 from Werner and Pfleiderer) at 250° C. and with a throughput of 10 kg/h, the mixture was extruded and the extrudate was cooled and granulated. The moldings were then produced from the granules by injection molding.

COMPARATIVE EXAMPLES V1 and V2

The procedure was similar to that of Example 1.

The compositions and properties of the thermoplastic molding materials are listed in the table.

The notched impact strength $a_k$ (injection temperature/test temperature) was measured according to DIN 53,453 at a test temperature of 23° C. using standard small bars injection molded at 220° C. and 250° C.

The heat distortion resistance Vicat B 50 was determined according to DIN 54 460.

The volume flow index MVI was determined according to DIN 53,735 at 200° C. and under a load of 21.6 kg.

The yellowing during storage at elevated temperatures was determined visually after 16 days at 110° C.

Values:
1=no change
2=slight change
3=clearly visible change
4=pronounced yellowing

TABLE

| Ex. | Components [% by wt.] | | | | | $a_k$ (220/23) [kJ/m²] | $a_k$ (250/23) [kJ/m²] | Vicat [°C.] | MVI [ml/10 min] | Yellowing |
| | A) | B) | C) | CV) | Additive | | | | | |
|---|---|---|---|---|---|---|---|---|---|---|
| 1 | 58.8 | 19.6 | 19.6 | — | 2 | 63 | 57 | 103 | 16.7 | 1–2 |
| V1 | 58.8 | 19.6 | — | 19.6 | 2 | 19 | 55 | 99 | 11.6 | 2–3 |
| V2 | 78.4 | 19.6 | — | — | 2 | 63 | 61 | 124 | 5.0 | 4 |

We claim:

1. Thermoplastic molding materials consisting essentially of
   A) from 10 to 90% by weight of an aromatic polycarbonate,
   B) from 5 to 50% by weight of a thermoplastic polyurethane and
   C) from 5 to 40% by weight of a copolymer consisting essentially of
      $c_1$) from 70 to 85% by weight of styrene or a substituted styrene of the formula I

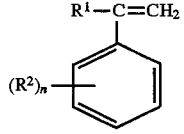

(I)

where $R^1$ is alkyl of 1 to 8 carbon atoms or hydrogen, $R^2$ is alkyl of 1 to 8 carbon atoms and n is 0, 1, 2 or 3, and
      $c_2$) from 15 to 30% by weight of (meth)acrylonitrile, maleic anhydride, maleimides N-substituted by $C_1$–$C_8$-alkyl or by $C_6$–$C_{20}$-aryl, or mixtures thereof.

2. A thermoplastic molding material as defined in claim 1, which contains component A) in an amount of from 30 to 80% by weight, component B) in an amount of from 10 to 40% by weight and component C) in an amount of from 10 to 30% by weight.

3. A molding formed from the thermoplastic molding material defined in claim 1.

4. A thermoplastic molding material as defined in claim 1 where component C is a copolymer selected from the group consisting of styrene/acrylonitrile copolymers, α-methylstyrene/acrylonitrile copolymers, styrene/maleic anhydride copolymers, styrene/phenylmaleimide copolymers, styrene/acrylonitrile/maleic anhydride copolymers and styrene/acrylonitrile/phenylmaleimide copolymers.

5. A thermoplastic molding material as defined in claim 1 where component C is a styrene/acrylonitrile copolymer.

6. A thermoplastic molding material as defined in claim 1 where component C is a α-methylstyrene/acrylonitrile copolymer.

* * * * *